United States Patent
Bittinger et al.

[11] Patent Number: 6,148,340
[45] Date of Patent: Nov. 14, 2000

[54] METHOD AND SYSTEM FOR DIFFERENCING CONTAINER FILES

[75] Inventors: Reed Bittinger, Raleigh; Nils C. Brubaker; Barron Cornelius Housel, III, both of Chapel Hill; Steve Wang, Cary, all of N.C.

[73] Assignee: International Business Machines Corporation, Armonk, N.Y.

[21] Appl. No.: 09/070,513

[22] Filed: Apr. 30, 1998

[51] Int. Cl.[7] .................................................. G06F 3/00
[52] U.S. Cl. ........................ 709/224; 709/224; 709/203
[58] Field of Search .................................. 709/203, 224, 709/226, 225, 207, 208

[56] References Cited

U.S. PATENT DOCUMENTS

| | | | |
|---|---|---|---|
| 5,315,703 | 5/1994 | Matheny et al. | 345/507 |
| 5,367,633 | 11/1994 | Matheny et al. | 345/514 |
| 5,754,774 | 5/1998 | Bittinger et al. | 709/203 |
| 5,809,235 | 9/1998 | Sharma et al. | 709/230 |
| 5,859,971 | 1/1999 | Bittinger et al. | 709/203 |
| 5,867,661 | 2/1999 | Bittinger et al. | 709/227 |
| 5,878,213 | 3/1999 | Bittinger et al. | 709/203 |
| 5,937,421 | 8/1999 | Petrov et al. | 707/526 |

FOREIGN PATENT DOCUMENTS 9730539  8/1997  WIPO .......................... H04L 29/06

OTHER PUBLICATIONS

"The Power of EDM's Object Differencing", 2 pages (www.novadigm.com/cb4cl.htm), Mar. 6, 1998.

"EDM In–Depth"—2 pages (www.novadigm.com), Mar. 16, 1998.

"Delta Delivery"—1 page (www.novadigm.com), Mar. 16, 1998.

*Primary Examiner*—Ahmad F. Matar
*Assistant Examiner*—Khanh Quang Dinh
*Attorney, Agent, or Firm*—Jeanine S. Ray-Yarletts

[57] ABSTRACT

A method and system for efficiently updating container objects on remote systems. The method and system involve a server extension which determines whether the files within the container object have changed since the last time they were sent to the client. If they have changed, the server extension sends only the changed files with instructions on how to reconstruct the container object to a client extension. The client extension receives the changes and the instructions and reconstitutes the container object and transmits the container object to the client browser.

12 Claims, 5 Drawing Sheets

METHOD AND SYSTEM FOR DIFFERENCING CONTAINER FILES

BACKGROUND OF THE INVENTION

In the ever expanding area of computer communications systems the use of networking communications systems is becoming more and more pervasive. Problems have arisen in the amount of time it takes to transmit substantial amounts of information over slow systems (e.g. wireless and wired modems). A typical office environment utilizes a LAN of some type for telecommunications. A typical Ethernet runs at 10,000 kbps (thousand bits per second) while a token ring is capable of running at 16,000 kbps. The typical telephone line is capable of transmitting 56 kbps and usually transmits 28.8 kbps while the typical packet radio link is only capable of transmitting up to 19.2 kbps and averages 4.8 kbps. This is a significant reduction in response time from what one is used to experiencing on their workstation attached via LAN in the typical office to what one would see at their home or working remotely. This causes an unacceptable reduction in the responsiveness of a computer when the connection is changed from a fast connection to a slow connection.

The increase in the use of the Internet (or the World Wide Web) has drawn attention to this shortcoming. The Internet paradigm is one of clients (usually browsers) communicating with Internet servers. This communication in the web environment is also expected to be 'real-time' rather than the old telecommunications paradigm of e-mail or typical batch-type processing The communication between these clients and servers is machine independent and utilizes a connectionless, best-effort protocol. Each transaction between the client and the server is self-contained or "stateless" as it is currently termed. This increases the portability of the applications but also increases the amount of information which must be transferred between the client and the server to complete a given transaction. In addition, most web pages today contain graphics which are very large. While most browsers allow a user to execute in 'text only' mode, a majority of the users ignore this option due to the enhanced benefit that the graphics provide.

The growth of Java applets and the requirement to download complex applets (very large, approximately 10s of thousands of bytes) with associated JAR files (also very large, many over 100s of thousands of bytes) has also made transmission times unacceptable to many users, especially at network speeds of less than 56 kbps. JAR files are containers that hold multiple files which are collected into one large file for transmission. This container can be transmitted in either a compressed or an uncompressed form. This problem of repeated transmission becomes particularly burdensome when files must be repeatedly downloaded from one session to the next either because of a minor update to one of the objects in the container or because the browser does not retain cached objects across sessions.

Many software manufacturers make non-applet software available on the world wide web (the Web) in the form of ZIP or self-extracting ZIP archive files. ZIP archive files are container files that have a publicly known architecture. JAR files are actually a subset of the overall ZIP file architecture. The ZIP files can be downloaded directly with a Web browser, but such downloads take a significant amount of time. Some companies have created products that will compare a file with a previous version of the file prior to refreshing the file on the remote computer in an effort to reduce the response time as perceived by the user. An example of such a product is Novadigm's EDM. EDM compares a file to be transmitted to a remote computer with the copy of the file that was most recently sent to the same remote computer. If the file has changed it is resent; if it has not changed it is not resent. This is acceptable for most files but if the user had a previously downloaded version of the archive, it would be valuable to be able to download only the portions of the archive which had changed in order to bring the user to the current version of the product and not be required to retransmit the entire compilation. This would significantly reduce the transmission time for software distributors who were attempting to ship updates and fixes over the Web.

RELATED PATENTS

U.S. patent application Ser. No. 08/601,903 entitled *Differencing Communications System* filed on Feb. 15, 1996 U.S. Pat. No. 5,859,971 and assigned to the assignee of the present invention.

U.S. patent application Ser. No. 08/601,804 entitled *Client/Server Communications System* filed on Feb. 15, 1996 U.S. Pat. No. 5,754,774 and assigned to the assignee of the present invention.

U.S. patent application Ser. No. 08/819,222 entitled *Method and Apparatus for Optimal Rebasing of Web Page Transmission* filed on Mar. 17, 1997 and assigned to the assignee of the present invention.

U.S. patent application Ser. No. 08/852,586 entitled *Terminal Emulator Data Stream Differencing System* filed on May 7, 1997 U.S. Pat. No. 5,909,569 and assigned to the assignee of the present invention.

OBJECTS OF THE INVENTION

It is an object of the present invention to reduce the time required to maintain currency of container objects in distributed systems, particularly in a network environment where the remote clients are connected to the server via a slow link (less than 56 kbps).

An additional object of the invention is to exploit the independence of the header information for a container object from the body of the object within the container.

It is yet another object of the present invention to avoid UNZIP processing to determine if objects require updating at the client.

It is still another object of the present invention to reduce the overall network traffic and increase the reliability of the information transmitted.

SUMMARY OF THE INVENTION

The present invention utilizes a client extension and a server extension, embodied as a Client Side Intercept (CSI) and Server Side Intercept (SSI) defined in the patent applications articulated above, to reduce the transmission time necessary for updating containers such as JAR and ZIP files in a client computer. It takes advantage of the container file architecture and the CRC uniqueness to ensure the correct version of the file resides in the client without requiring transmission of the entire file to the client for subsequent updates.

DETAILED DESCRIPTION OF THE PREFERRED EMBODIMENT

Figure 1:
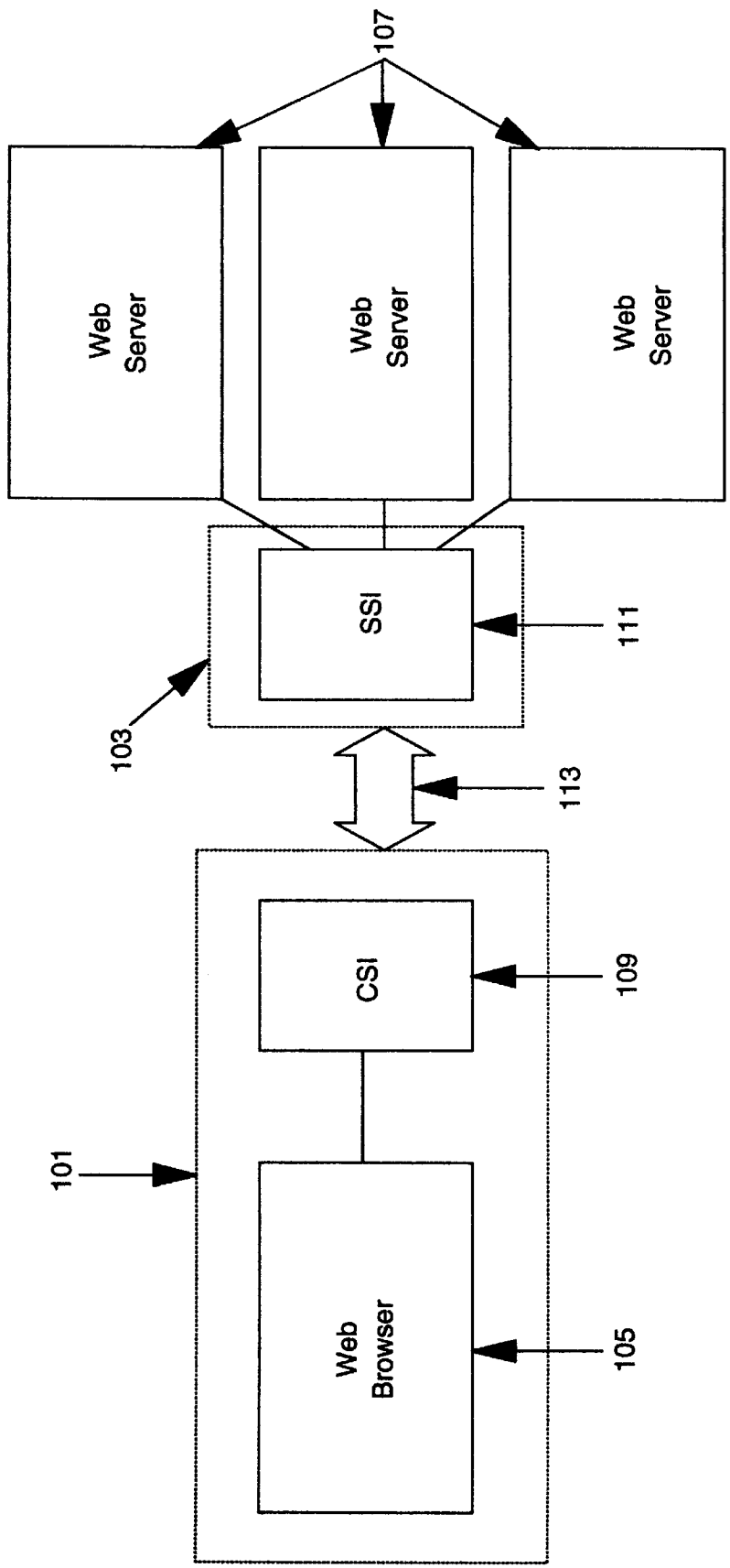
FIG. 1 is a graphical representation of a client—server connection utilized in the present invention.

The present invention will now be described more fully with reference to the accompanying drawings. The preferred embodiment of the present invention is implemented in a client—server computing environment as depicted in FIG. 1. FIG. 1 shows a client computer 101 connected over a communications channel 113 to a logical server computer 103. In the Internet environment, the communications channel is a TCP/IP (Transmission Control Protocol/Internet Protocol) connection over media such as traditional telephone lines, a LAN or wireless media. In the preferred embodiment, the client computer is executing a web browser 105 such as Netscape's Navigator™ or Microsoft's Internet Explorer and also contains a client extension such as the client side interceptor (CSI) 109 which appears to be a proxy to the web browser. The logical server computer 103 contains a server extension, embodied as a server side interceptor (SSI) 111, which is transparent to the web server. The SSI is connected to one or more web servers 107 (or proxies) which are where the information is stored that the client ultimately desires to access. These servers work in conjunction to serve information to the client computer. The client side interceptor 109 and the server side interceptor 111 work together to reduce the transmission of information between the client computer 101 and the server computer 103 as described in further detail in U.S. patent application Ser. No. 08/601,903 entitled *Differencing Communication System* referenced above. While the above mentioned prior art utilizes the client side interceptor and the server side interceptor to reduce the flow of information between the client and the server, it does so only for conventional, entire files such as HTML and text documents. The prior art does not provide for the selective updating of objects within a container.

Figure 5:
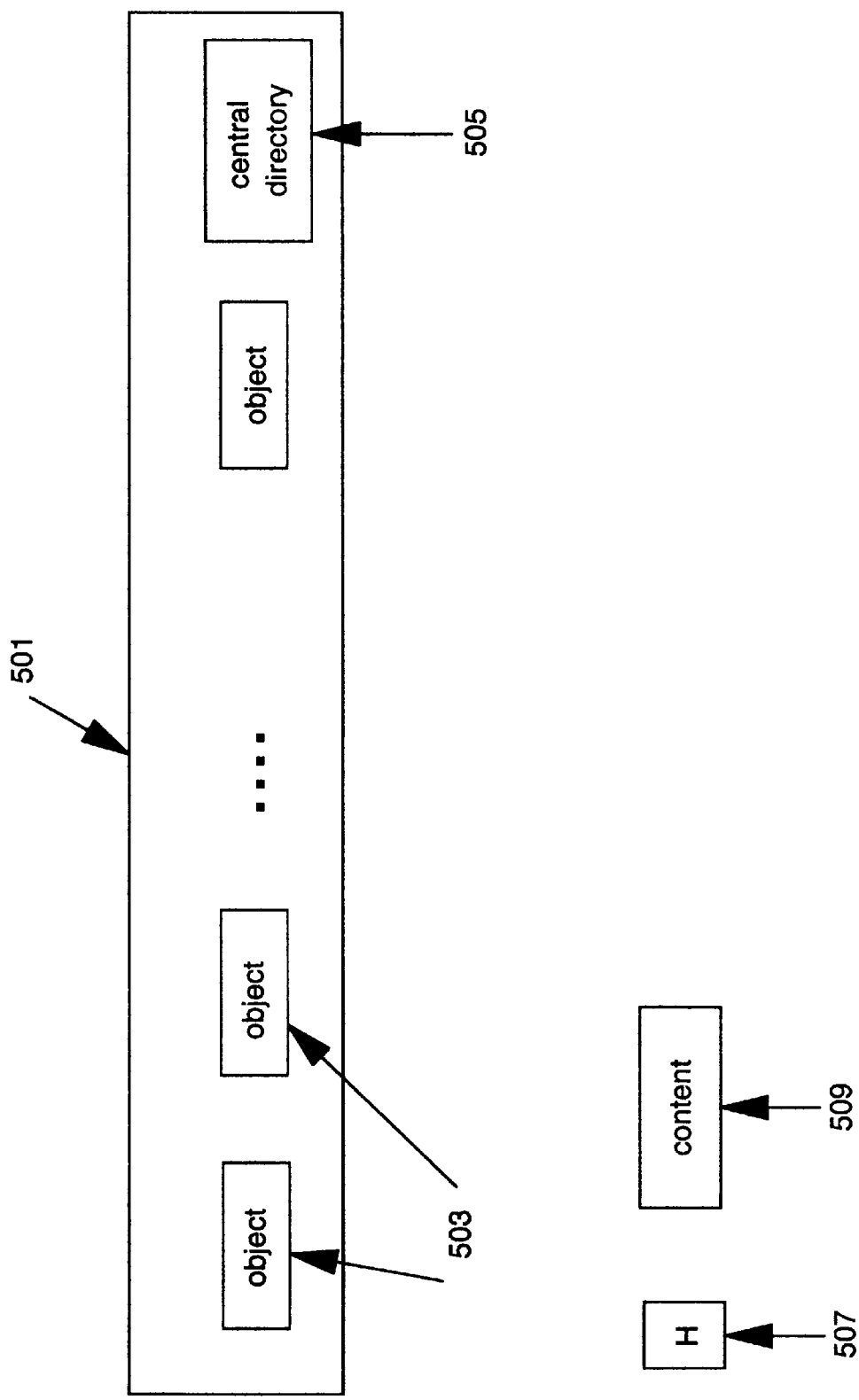
FIG. 5 is a symbolic representation of a container file layout.

FIG. 5 depicts a typical layout of a JAR or ZIP container 501. The container layout 501 contains one or more objects 503, each object having a CRC associated therewith. The container also contains a central directory 505. Each of the objects 503 contains a header 507 and a contents 509 section. The containers are usually referenced, in communications transactions, by their URL (Uniform Resource Locator).

The present invention utilizes the characteristics of the container architecture and CRCs to allow for the selective updating of container objects. JAR and ZIP files, for example, are containers which consist of a sequence of objects followed by a central directory (see FIG. 5). When processing a JAR or ZIP file, the present invention constructs a catalog from the central directory and the object headers. Each object in the container has a corresponding entry in the catalog which includes the member name (and path), size, a 32 bit CRC (cyclic redundancy check) of the object contents as well as the size and CRC of the object header. In the present invention, upon receiving a container for the first time, the SSI constructs and caches its catalog. This allows for a point of reference to determine whether the objects of a container have changed as further instances of the container are passed through the SSI. When a container with the same name as one that has previously passed through the SSI is routed through the SSI, the SSI uses some unique identifier for the container (e.g. time stamp, server entity tag, or computed CRC) to determine if the newly arrived container is different from the one previously passed through the SSI. If the new container is the same, no update is required. If the new container is different, then the SSI must determine which objects of the container are different. In the preferred embodiment, an object within the container is considered identical to the original object if its CRC and length are the same as the original object. The position of the object within the container can change without requiring the object to be resent to the client. The object may also have a different path name or time stamp without changing the contents of the object. The present invention prevents the unnecessary resending of objects due to time stamp or path change without changing the contents of the object.

When a cached catalog is compared with a newly received catalog in the present invention, a difference data stream is generated that consists of a sequence of copy 201 and insert 221 commands as shown in FIG. 2. If an object in the new container is identical to the object of a cached container (ie. CRC and length are the same) then a copy command is generated to indicate that the CSI should copy the corresponding object from the existing container into the updated container that it is constructing. If an object of the container has been changed or is new, an insert command is created, followed by the byte sequence that constitutes the new or updated object. This byte sequence is taken as is from the new container received at the SSI. There is no requirement for content transformation such as encryption or decryption. If an object is deleted from the cached container entry, no command is emitted. This results in the object not being reconstructed at the CSI when the information is sent to the CSI and achieves the desired result.

Figure 2A:
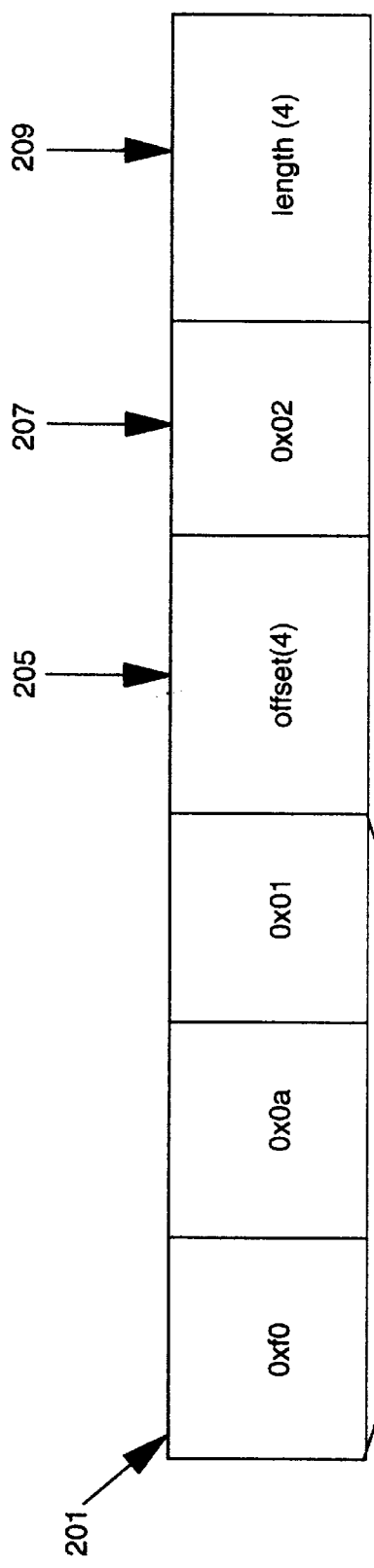
FIG. 2a is an example of the header structure for a copy command.

The difference data stream of the present invention is host independent. The data stream is in the form of an HTTP response. The HTTP header identifies it as a difference data stream. The data stream consists of a sequence of copy and insert commands. The example copy command 201 as shown in FIG. 2a begins with the bytes '0xf0 0x0a 0x01' 203 to identify it as a copy, followed by a 4-byte offset field 205 to indicate where the information should be copied from followed by '0x02' 207 followed by a 4-byte length field 209 to indicate the quantity of information to be copied.

Figure 2B:
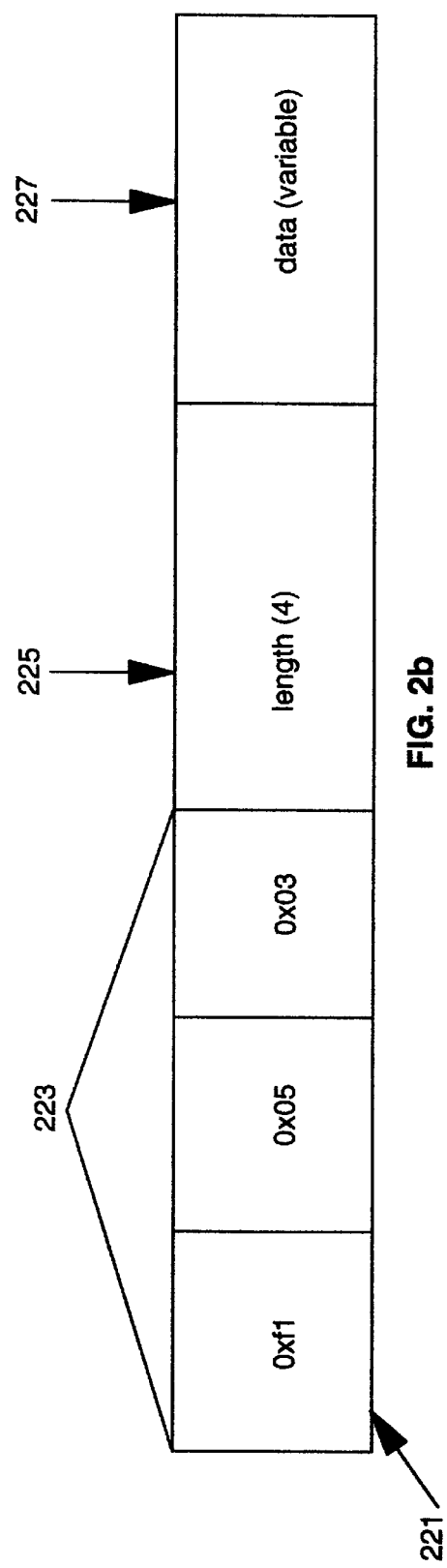
FIG. 2b is an example of the header structure for an insert command.

A sample insert command 221 is depicted in FIG. 2b. The insert command of the preferred embodiment begins with the destinctive sequence of '0xf1 0x05 0x03' 223 which is followed by a 4 byte length field 225 to indicate the length of the information that is being transmitted followed by the data itself 227 that is to be inserted into the container object at the client. The insert and copy data streams depicted in FIGS. 2a and 2b are examples and are not meant in any way to limit or restrict the present invention. It should also be obvious to one skilled in the art that, for efficiency, contiguous insert commands or copy commands may be combined.

When the CSI receives the difference data stream it constructs the updated container from both data in the cached container and from contents received in the data stream. The construction following the series of insert and copy commands results in a bit-wise identical object to the new container received at the SSI. In the preferred embodiment, a check is made to determine if the difference data stream is larger than the new container object itself; if so, the new container is transmitted to the CSI instead of the difference data stream.

Figure 3:
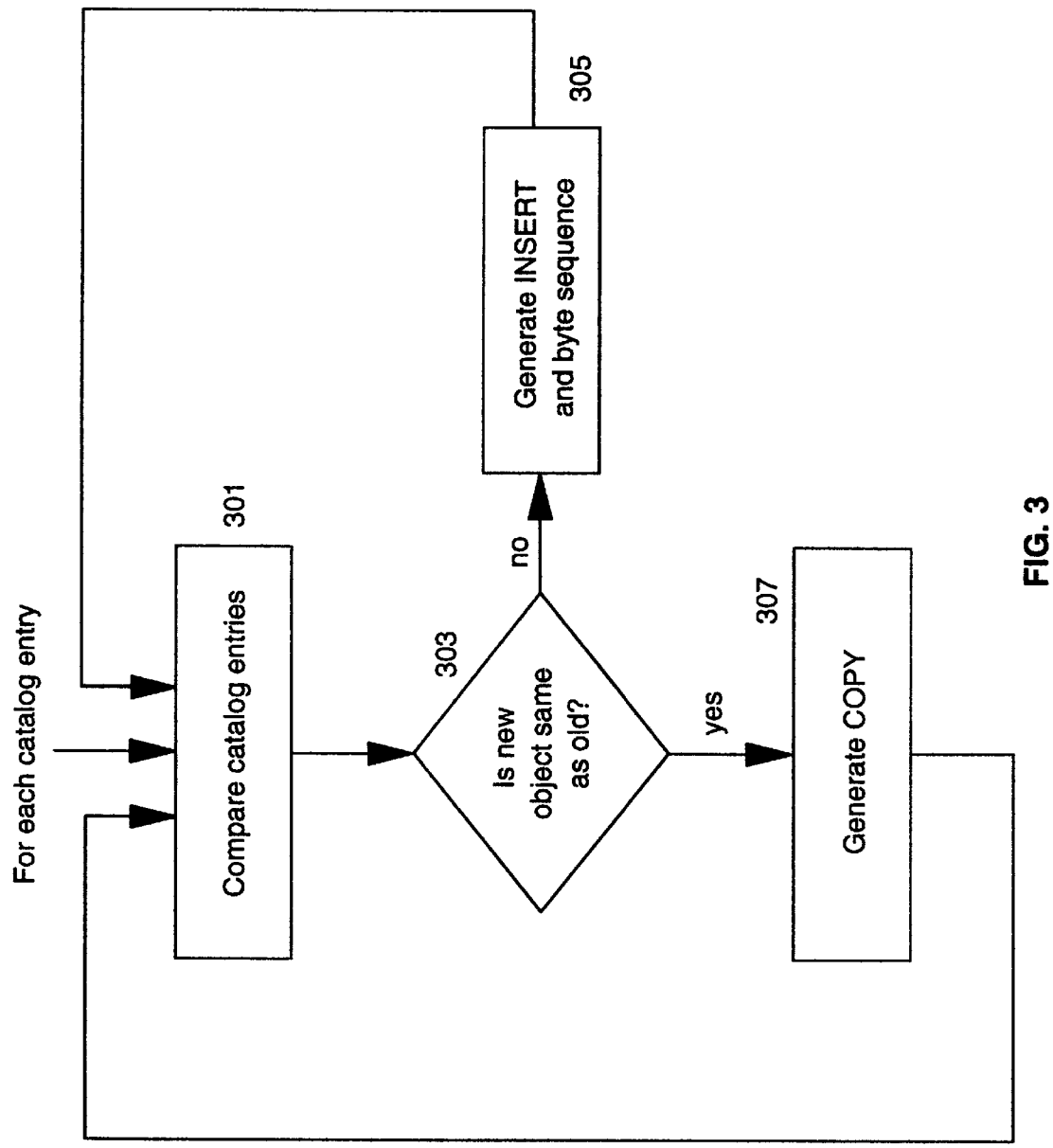
FIG. 3 is a flow chart of the differencing of the present invention.

A flow chart of the processing of the container catalog at the SSI in preparation for sending to the CSI is shown in FIG. 3. At 301 the entry in the catalog cached at the SSI is compared with the incoming catalog entry for the client. If an object of the new catalog is the same as the object represented in the cached catalog entry 303 then a COPY command is generated 307 for transmission to the CSI. If the object of the new catalog is different than the object represented in the cached catalog, then an INSERT command 305 is generated with the byte sequence to be sent to the CSI for insertion. This is repeated for each object of the new catalog.

A further refinement to the above process is to separately compare each object's header and contents. Under this enhancement, for each object in the incoming catalog, a search by the CRC of the object contents is performed in the cached catalog. If a match is found, the CRC of the object header in the matched entry is then compared with that of the new entry. If the object header CRCs match, then both the object header and the contents of the object match so a single COPY command is generated for both. If the CRCs of the object header do not match, then an INSERT command is generated for the object header portion only, and a COPY command is generated for the object contents portion. As in the preceding paragraph, if there is no match on the CRC for the contents of the object, then an INSERT command is generated for the entire object, both header and contents portions.

Figure 4:
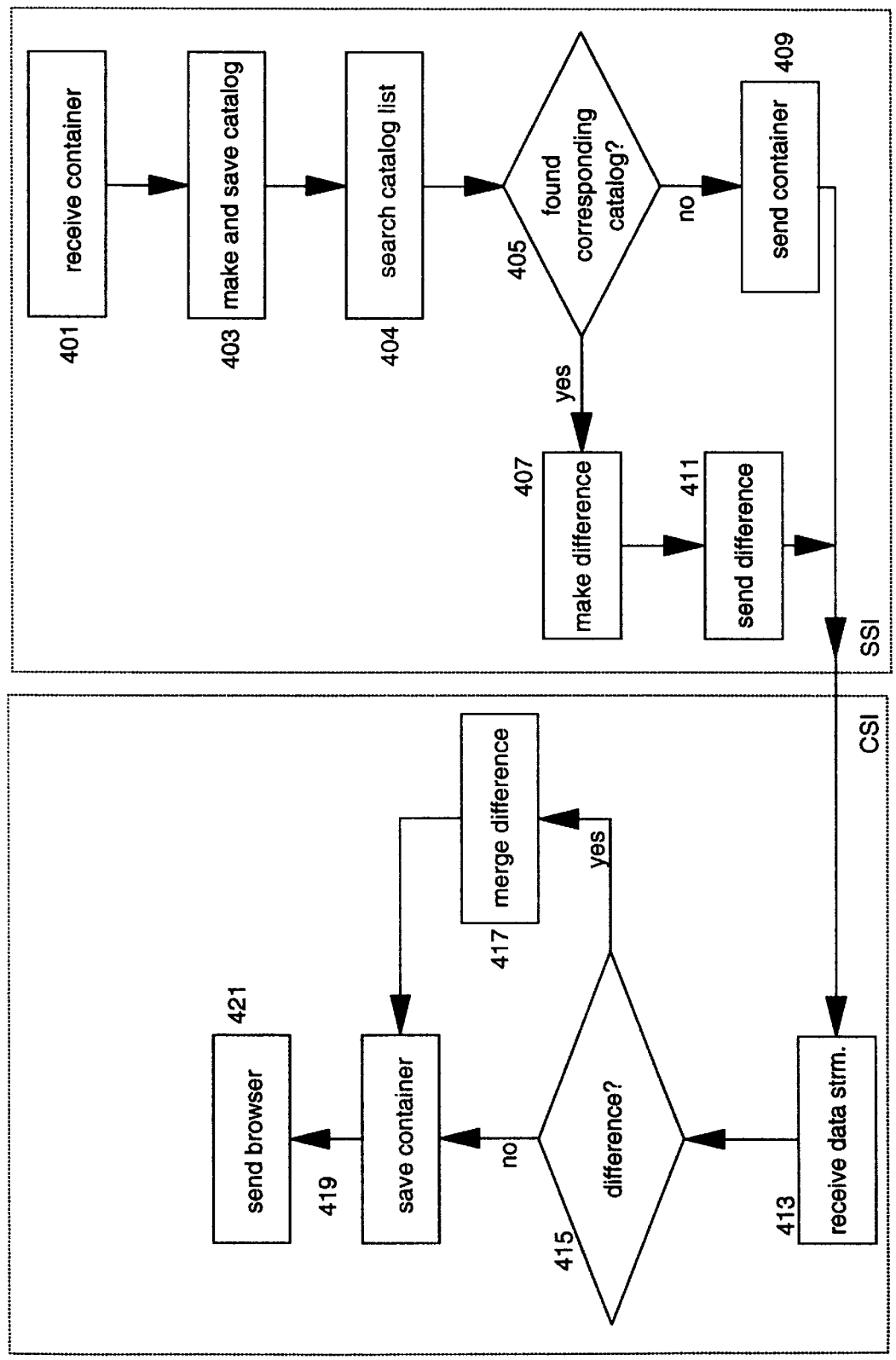
FIG. 4 is a flow diagram depicting the information transmission of the present invention.

A flow chart of the process of receiving a container is shown in FIG. 4. First, the client receives a request for a container. The CSI sends this request to the SSI along with a unique identifier (e.g. time stamp, entity tag or CRC) of the level of the container it last received from the SSI. In the preferred embodiment the CSI sends an HTTP header indicating the differencing of the present invention. The diagram of FIG. 4 shows the response flow to the CSI and begins with the server (SSI) receiving a container 401 targeted for the client. The SSI then makes a new catalog for the container 403 and saves it in its cache. In the preferred embodiment, each catalog in the cache is identified by the CRC of the container from which the catalog was generated. There is no limitation or restriction as to how the catalog is identified: any unique identifier (e.g. time stamp, entity tag) will do, so long as it corresponds to the identifier included in the CSI request. Next a check is made to determine whether there exists a previously cached catalog 404 matching the unique identifier in the CSI request. If a previously cached catalog of the correct version exists 405, then a difference is created 407 using the old and the new catalogs, according to the process described in FIG. 3. The difference file created at 407 is sent to the CSI 411. If no matching catalog was found 405, hence no difference file was created then the entire container is sent 409. In either case, the actual container is then discarded from the server to conserve space. The CSI receives the data stream 413 and checks to see if there are differences indicated 415. If there are differences indicated then the differences are merged with the existing container 417. If there are no differences indicated, the container is saved as it has been sent 419 and it is transferred from the CSI to the client browser 421. If there are difference files, then the reconstituted container 417 is sent to the browser 421.

When the information is sent from the SSI to the CSI, the cache of the SSI is updated with the most current catalog. If the system is designed such that an SSI serves only one CSI, then the process is complete. If, however, as in the preferred embodiment, a single SSI can handle multiple clients, then it is necessary to maintain multiple generations of the container catalog at the SSI since different clients may be at different levels. In the preferred embodiment, each CSI maintains a unique identifier of each cached container. When the CSI detects that a container is being requested, it sends the unique identifier of its cached container (or a null if this is the first request) to the SSI. The SSI uses this unique identifier to locate the correct generation of the container's cached catalog before processing the request as was shown in items 404 and 405 of FIG. 4.

In the preferred embodiment in order to optimize performance and conserve space, the SSI maintains a maximum number of cached catalogs for a given container. Once the maximum is reached, a garbage collection algorithm is implemented to remove the excess catalogs from the cache of the SSI.

A variation not implemented in the preferred embodiment would be to maintain the objects in the cache of the server. This would allow the application to do second level differencing (e.g. binary) on the objects. In the preferred embodiment, the containers are not kept at the server to preserve space; therefore, the second level differencing is not done.

The present invention, while intended to improve user satisfaction by decreasing the response time perceived by end users of the client, has other benefits. In certain countries telephone connections are charged by the minute. Implementation of the present invention can significantly reduce the charges associated with web browsing in this instance. In addition, the decreased size of the 'update' files as compared to the size of the containers themselves saves significant cost when the transmission medium is less than perfectly reliable. The smaller the data stream being sent, the less likely that information will be dropped. In addition, if the information is dropped or corrupted, there is less to resend.

What is claimed is:

1. In a computer system having a client connected to at least one server over a communications mechanism, said client having a client extension associated therewith and said at least one server having a server extension associated therewith, said client and said server utilizing containers for the transmission of information, each container having one or more objects, said objects having associated lengths and CRCs, said objects also having header and contents portions, a method for reducing the amount of information sent from said server to said client in said communications system, said method comprising:

requesting, by a browser at said client, a URL (Uniform Resource Locator), said URL comprising the name of a container file;

passing said request from said browser at said client to said client extension;

recognizing, by said client extension, said requested name of said container file as one that had been previously cached;

passing said request for said named container from said client to said server extension, said passed request including a unique identifier (such as a CRC) of the previously cached container having the requested name;

receiving, by the server extension, the request for said named container;

passing, by said server extension, said request for said named container to said web server indicated in said URL;

receiving a response, at said server extension, from said web server;

if said response indicates that a new version of the named container file exists then:
- creating a catalog, at said server extension, from said new version of said named container file;
- computing a unique identifier for said named container file;
- adding said catalog and said unique identifiers for said catalog to a catalog list at said server;
- searching said catalog list for a catalog whose unique identifier matches the unique identifier of said passed request received from said client;
- creating a difference file between the matched catalog and the catalog of the new version of said named container file if a match is found and sending said difference file to said client extension; and,
- sending the new version of said named container file to said client if no match is found.

2. A method as claimed in claim 1 wherein said difference file is created by comparing, for each object within the container to be transmitted, the length and the CRC in the matched catalog with the length and CRC in the catalog of the new version of said named container, if either the length or the CRC are different or non-existent then the object is added to the difference file with an associated INSERT command, if neither the length nor the CRC are different then a COPY command is inserted into the difference file.

3. A method as claimed in either of claims 1 or 2 wherein said difference file is created by comparing, for each object within the container to be transmitted, first the length and the CRC of the object contents in the matched catalog with the length and CRC of the object contents in the catalog of the new version of said named container, if either the length or the CRC are different or non-existent then the object is added to the difference file with an associated INSERT command, if neither the length nor the CRC are different then the CRC of the object header in the matched catalog is compared with the CRC of the object header in the new version, if the CRCs are different then an INSERT command is inserted into the difference file for the object header and a COPY command is inserted into the difference file for the object contents, if the CRCs for the object header are not different, then a COPY command is inserted into the difference file.

4. A method as claimed in claim 1 or 2 wherein said container is discarded from the memory of said server after the difference file is sent to the client.

5. In a computer system having a client connected to at least one server over a communications mechanism, said client having a client extension associated therewith and said at least one server having a server extension associated therewith, said client and said server utilizing containers for the transmission of information, each container having one or more objects, said objects having associated lengths and CRCs, said objects also having associated header and contents portions, an apparatus for reducing the amount of information sent from said server to said client in said communications system, said apparatus comprising:
- means for requesting, by a browser at said client, a URL, said URL having the name of a container file;
- means for passing said request from said browser at said client to said client extension;
- means for recognizing, by said client extension, said requested name of said container file as one that had been previously cached by said client;
- means for passing said request for said named container from said client to said server extension, said passed request including a unique identifier (such as a CRC) of the previously cached container having the requested name;
- means for receiving, by the server extension, the request for said named container;
- means for passing, by said server extension, said request for said named container to said web server indicated in said URL;
- means for receiving a response, at said server extension, from said web server;

if said response indicates that a new version of the named container file exists then:
- means for creating a catalog, at said server extension, from said new version of said named container file;
- means for computing a unique identifier for said named container file;
- means for adding said catalog and said unique identifier to a catalog list at said server;
- means for searching said catalog list for a catalog whose unique identifier matches the unique identifier of said passed request received from said client;
- means for creating a difference file between the matched catalog and the catalog of the new version of said named container file if a match is found and means for sending said difference file to said client extension; and,
- means for sending the new version of said named container file to said client if no match is found.

6. An apparatus as claimed in claim 5 wherein said difference file is created by comparing, for each object within the container to be transmitted, the length and the CRC in the matched catalog with the length and CRC in the catalog of the new version of said named container, if either the length or the CRC are different or non-existent then the object is added to the difference file with an associated INSERT command, if neither the length nor the CRC are different then a COPY command is inserted into the difference file.

7. An apparatus as claimed in claim 5 or 6 wherein said difference file is created by comparing, for each object within the container to be transmitted, first the length and the CRC of the object contents in the matched catalog with the length and CRC of the object contents in the catalog of the new version of said named container, if either the length or the CRC are different or non-existent then the object is added to the difference file with an associated INSERT command, if neither the length nor the CRC are different then the CRC of the object header in the matched catalog is compared with the CRC of the object header in the new version, if the CRCs are different then an INSERT command is inserted into the difference file for the object header and a COPY command is inserted into the difference file for the object contents, if the CRCs for the object header are not different, then a COPY command is inserted into the difference file.

8. An apparatus as claimed in claim 5 or 6 wherein said container is discarded from the memory of said server after the difference file is sent to the client.

9. A computer program product for reducing the amount of information sent from a server extension to a client extension in a communications system, said client extension having at least one client associated therewith and said server extension having at least one server associated therewith, said client and said server utilizing containers for the transmission of information, each container having one or more objects, said objects having associated lengths and CRCs, said objects also having associated header and contents portions, the computer program product comprising:
- a computer-readable program code means embodied in a computer-readable storage medium, said computer readable program code means comprising:

computer readable program code means for requesting, by a browser at said client, a URL, said URL comprising the name of a container file;

computer readable program code means for passing said request from said browser at said client to said client extension;

computer readable program code means for recognizing, by said client extension, said requested name of said container file as one that had been previously cached by said client;

computer readable program code means for passing said request for said named container from said client extension to said server extension, said passed request including a unique identifier (such as a CRC) of the previously cached container having the requested name;

computer readable program code means for receiving, by the server, the request for said named container;

computer readable program code means for passing, by said server extension, said request for said named container to said web server indicated in said URL;

computer readable program code means for receiving a response, at said server, from said web server;

if said response indicates that a new version of the named container file exists then:

computer readable program code means for creating a catalog, at said server, from said new version of said named container file;

computer readable program code means for computing a unique identifier for said named container file;

computer readable program code means for adding said catalog and said unique identifier to a catalog list at said server;

computer readable program code means for searching said catalog list for a catalog whose unique identifier matches the unique identifier of said passed request received from said client extension;

computer readable program code means for creating a difference file between the matched catalog and the catalog of the new version of said named container file if a match is found and sending said difference file to said client extension; and, computer readable program code means for sending the new version of said named container file to said client if no match is found.

10. A program product as claimed in claim 9 wherein said difference file is created by comparing, for each object within the container to be transmitted, the length and the CRC in the matched catalog with the length and CRC in the catalog of the new version of said named container, if either the length or the CRC are different or non-existent then the object is added to the difference file with an associated INSERT command, if neither the length nor the CRC are different then a COPY command is inserted into the difference file.

11. A program product as claimed in claim 9 or 10 wherein said difference file is created by comparing, for each object within the container to be transmitted, first the length and the CRC of the object contents in the matched catalog with the length and CRC of the object contents in the catalog of the new version of said named container, if either the length or the CRC are different or non-existent then the object is added to the difference file with an associated INSERT command, if neither the length nor the CRC are different then the CRC of the object header in the matched catalog is compared with the CRC of the object header in the new version, if the CRCs are different then an INSERT command is inserted into the difference file for the object header and a COPY command is inserted into the difference file for the object contents, if the CRCs for the object header are not different, then a COPY command is inserted into the difference file.

12. A program product as claimed in claim 9 or 10 wherein said container is discarded from the memory of said server after the difference file is sent to the client.

* * * * *